J. R. WIMER.
Monument.
No. 214,339. Patented April 15, 1879.
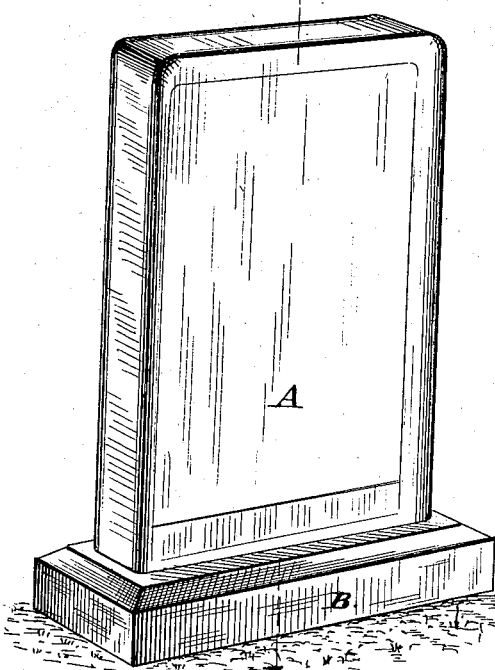
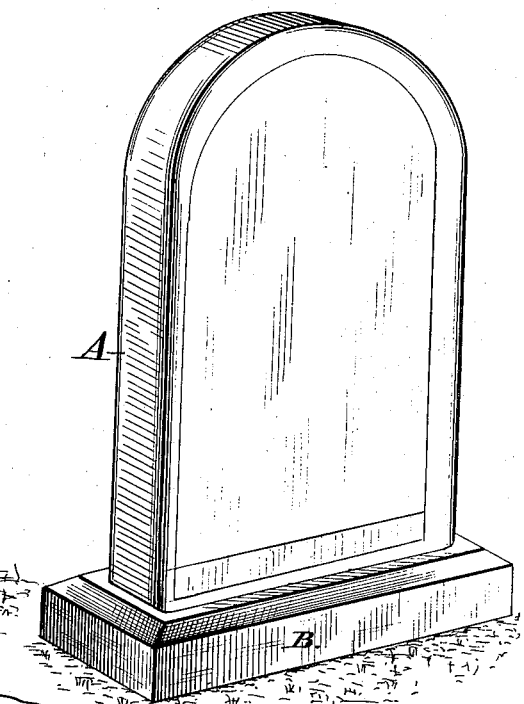
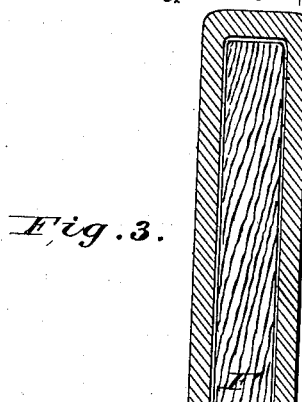
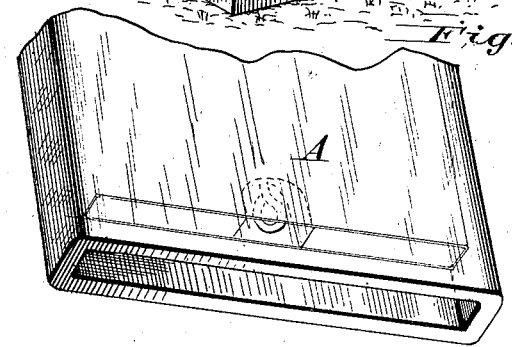
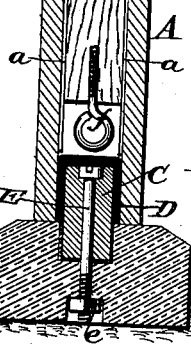
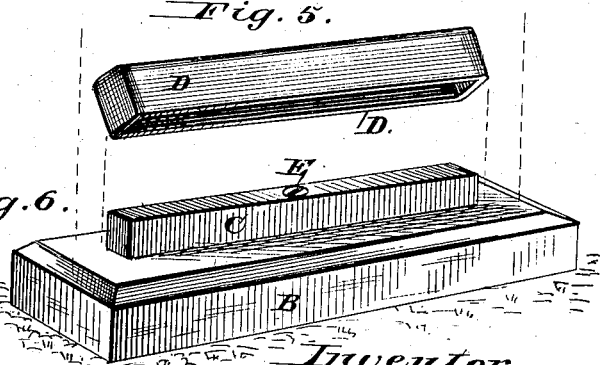

UNITED STATES PATENT OFFICE.

JOHN R. WIMER, OF HUNTINGDON, PENNSYLVANIA.

IMPROVEMENT IN MONUMENTS.

Specification forming part of Letters Patent No. 214,339, dated April 15, 1879; application filed March 5, 1879.

*To all whom it may concern:*

Be it known that I, JOHN R. WIMER, of Huntingdon, in the county of Huntingdon and State of Pennsylvania, have invented certain new and useful Improvements in Monuments; and I do hereby declare the following to be a full, clear, and exact description thereof, reference being had to the accompanying drawings, and to the letters of reference marked thereon.

The nature of my invention consists in the construction and arrangement of a monument, as will be hereinafter more fully set forth.

In order to enable others skilled in the art to which my invention appertains to make and use the same, I will now proceed to describe its construction, referring to the annexed drawings, in which—

Figures 1 and 2 are perspective views, showing different forms of monuments embodying my invention. Fig. 3 is a transverse vertical section; and Figs. 4, 5, and 6 are detailed views thereof.

B represents the foundation for the monument, which foundation is most generally of stone. Longitudinally in the upper surface of this foundation is set in a block or bar of iron, C, which is fastened by means of a bolt, E, passing down through the block and foundation, and a nut, e, screwed on the lower end of said bolt within a recess in the bottom of the foundation, as shown in Fig. 3. The iron block or bar C projects a suitable distance above the foundation, and over the same is placed a rubber cap, D, which entirely surrounds and covers the block.

A represents the body of the monument, which is made of glass of suitable thickness, and of any desired shape and size. This glass monument is made hollow, in a single piece, and open at the bottom only. The open bottom or lower end of the monument fits tightly over the rubber-packed iron block, the rubber forming the packing to make the joint air and water tight.

Within the hollow glass monument A is placed a piece of wood, F, filling the interior thereof, and on this wood are fastened tablets *a a*, of paper or other suitable material, for containing inscriptions, &c., which are therefore inclosed within the glass and not exposed to the weather.

*f* is an eye-screw or similar device, fastened in the lower end of the wood F, for withdrawing the same, if desired.

I am aware that monuments have been made of glass plates, or glass and other materials, and I do not claim such, broadly, as my invention.

Having thus fully described my invention, what I claim as new, and desire to secure by Letters Patent, is—

The glass monument A, made hollow, in a single piece, and open at the bottom only, in combination with the foundation B, block C, and rubber D, substantially as herein set forth.

JOHN R. WIMER.

Witnesses:
J. M. CROUCH,
PETER R. WEIMER.